US012688208B2

(12) United States Patent (10) Patent No.: US 12,688,208 B2

Tsuno et al. (45) Date of Patent: Jul. 21, 2026

(54) SERVER DEVICE, CONTROL METHOD THEREFOR, MAP CREATION SYSTEM, AND STORAGE MEDIUM

(71) Applicant: HONDA MOTOR CO., LTD., Tokyo (JP)

(72) Inventors: Koichi Tsuno, Wako (JP); Ryota Hisada, Tokyo (JP); Shinji Oka, Wako (JP); Yoko Saito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/895,563

(22) Filed: Sep. 25, 2024

(65) Prior Publication Data

US 2025/0021587 A1 Jan. 16, 2025

Related U.S. Application Data

(63) Continuation of application No. PCT/JP2022/015376, filed on Mar. 29, 2022.

(51) Int. Cl.
*G06F 16/00* (2019.01)
*G06F 16/23* (2019.01)
(Continued)

(52) U.S. Cl.
CPC .......... *G06F 16/29* (2019.01); *G06F 16/2379* (2019.01); *G06F 16/252* (2019.01)

(58) Field of Classification Search
CPC .... G06F 16/29; G06F 16/2379; G06F 16/252; G09B 29/00
See application file for complete search history.

(56) References Cited

U.S. PATENT DOCUMENTS

2013/0007840 A1* 1/2013 Sabin ..................... H04L 67/10
726/3
2017/0285655 A1* 10/2017 Katou .................. G09B 29/007
(Continued)

FOREIGN PATENT DOCUMENTS

CA 2850076 A1 * 2/2013 ......... G01C 21/3407
JP 2004-213239 A 7/2004
(Continued)

OTHER PUBLICATIONS

International Search Report dated Jun. 21, 2022, issued in counterpart International Application No. PCT/JP2022/015376, with English translation. (5 pages).
(Continued)

*Primary Examiner* — Dinku W Gebresenbet
(74) *Attorney, Agent, or Firm* — WHDA, LLP

(57) ABSTRACT

A management server includes a storage device for storing map data of an area in which a mobile object moves. The management server acquires, from the mobile object that is an operation target of the terminal device, a captured image by the mobile object. The management server provides, to the terminal device, screen data of an operation screen including a map based on the map data stored in the storage device and the captured image acquired, the operation screen being for receiving a user operation for processing the map. The management server acquires, from the terminal device, input data indicating an input by a user through the operation screen displayed based on the screen data in the terminal device, and updates the map data stored in the storage device according to the input data.

20 Claims, 10 Drawing Sheets

(51) Int. Cl.
  G06F 16/25 (2019.01)
  G06F 16/29 (2019.01)

(56) References Cited

U.S. PATENT DOCUMENTS

| | | | | |
|---|---|---|---|---|
| 2017/0357267 A1* | 12/2017 | Foster | .................. | G01C 21/005 |
| 2021/0108943 A1* | 4/2021 | Liang | ..................... | H04L 67/52 |
| 2021/0238017 A1 | 8/2021 | Hayashi | | |
| 2022/0342426 A1* | 10/2022 | He | ....................... | A01D 34/008 |
| 2022/0383211 A1* | 12/2022 | Kojima | .................. | G06Q 50/02 |
| 2023/0086887 A1* | 3/2023 | McClelland | .......... | B60W 50/14 |
| | | | | 701/25 |

FOREIGN PATENT DOCUMENTS

| | | | |
|---|---|---|---|
| JP | 2012-177808 A | 9/2012 | |
| JP | 2020-019644 A | 2/2020 | |
| WO | 2014/125866 A1 | 8/2014 | |

OTHER PUBLICATIONS

Written Opinion of the International Searching Authority (Form PCT/ISA/237) dated Jun. 21, 2022, issued in counterpart International Application No. PCT/JP2022/015376. (3 pages).

* cited by examiner

F I G. 1
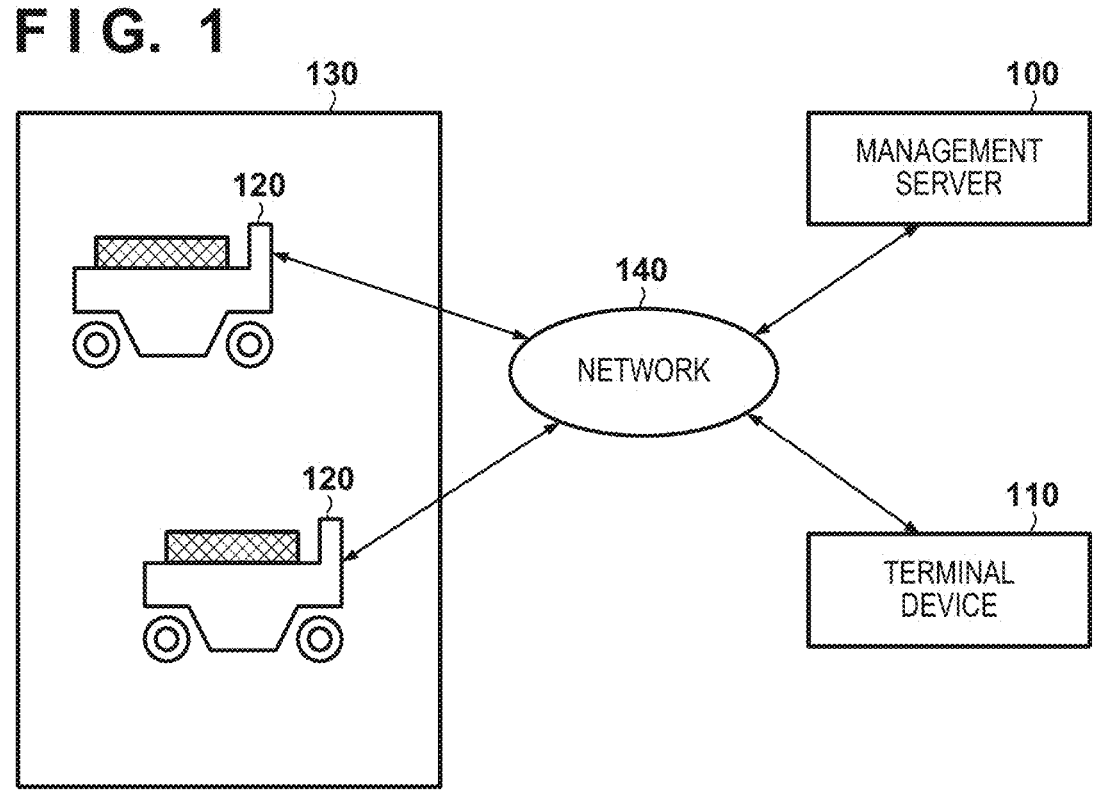
F I G. 2

F I G. 5
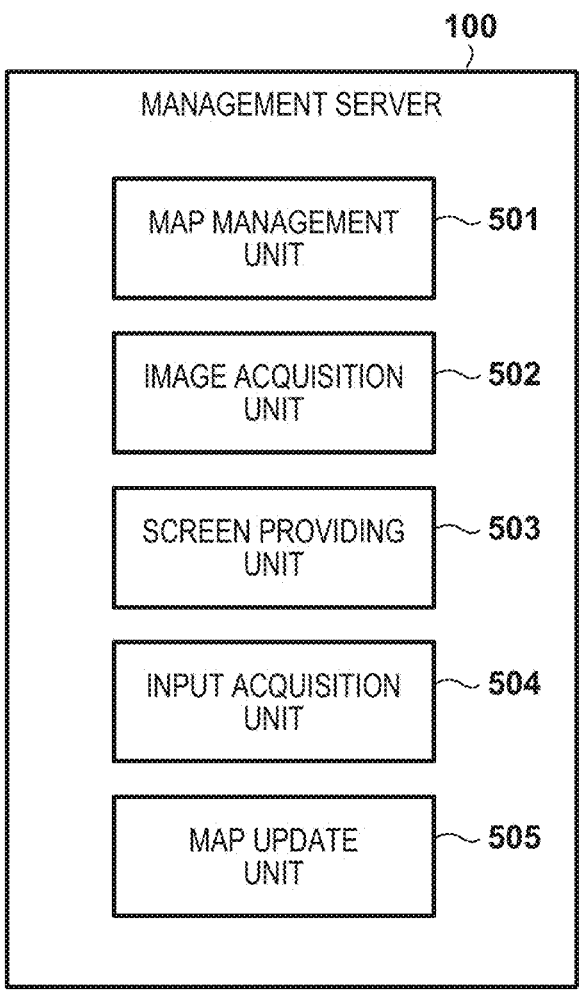

F I G.  6
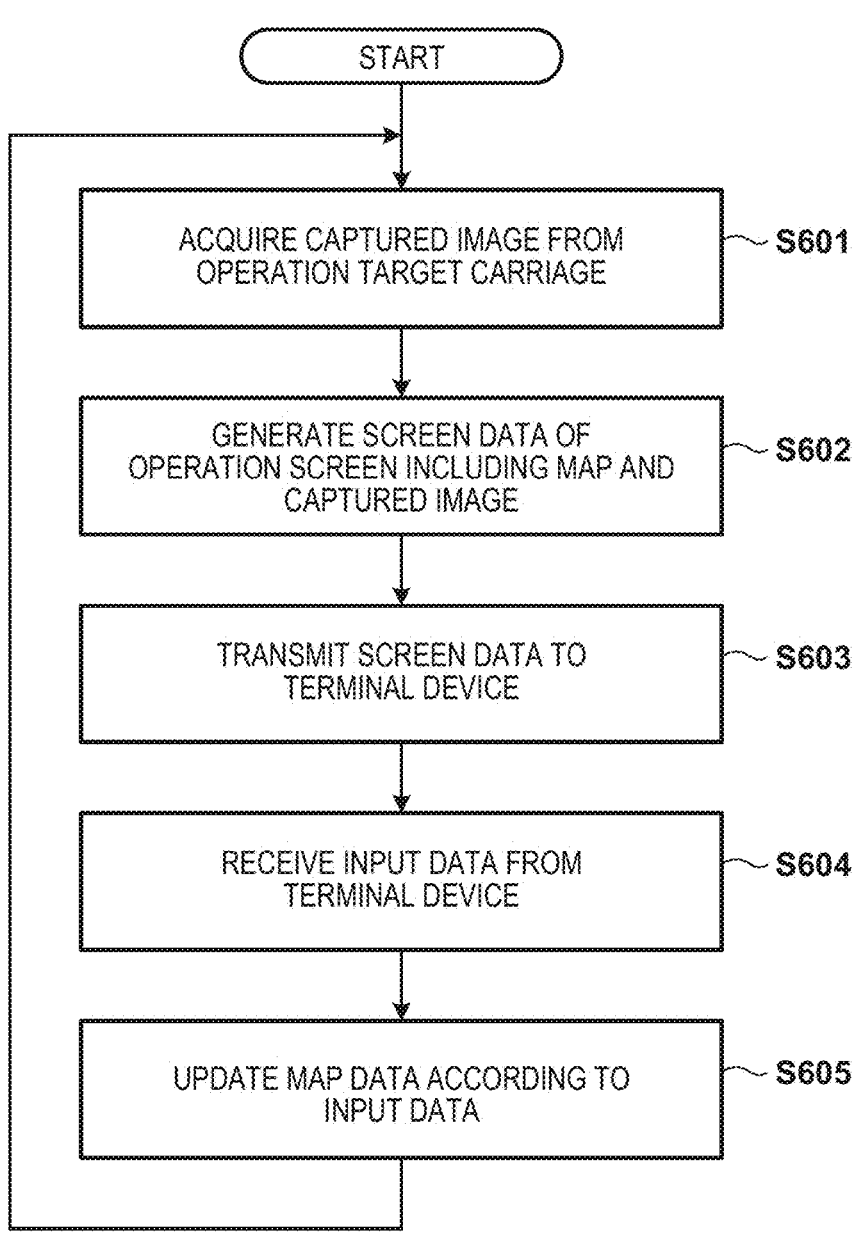

F I G. 7
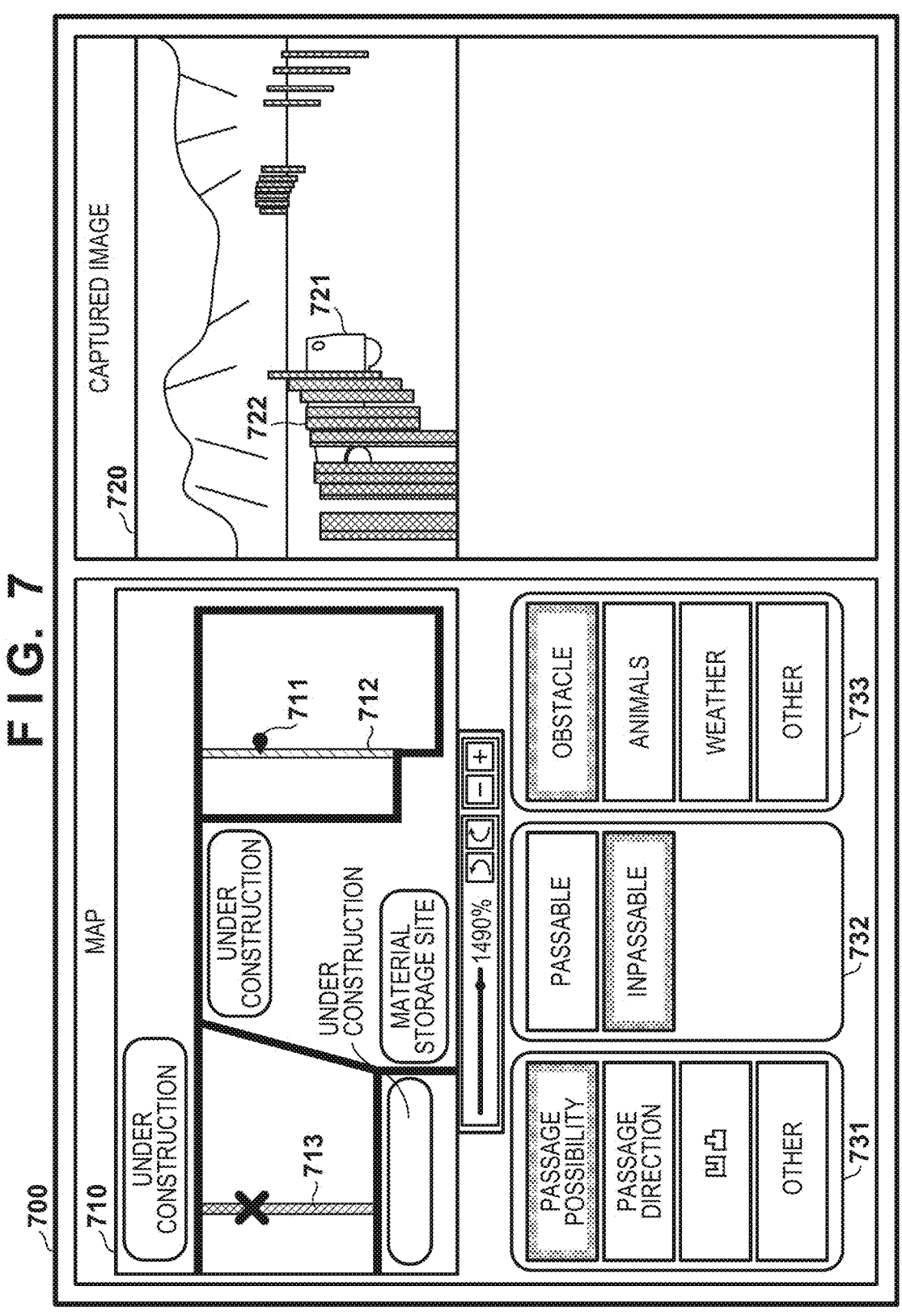

F I G. 8
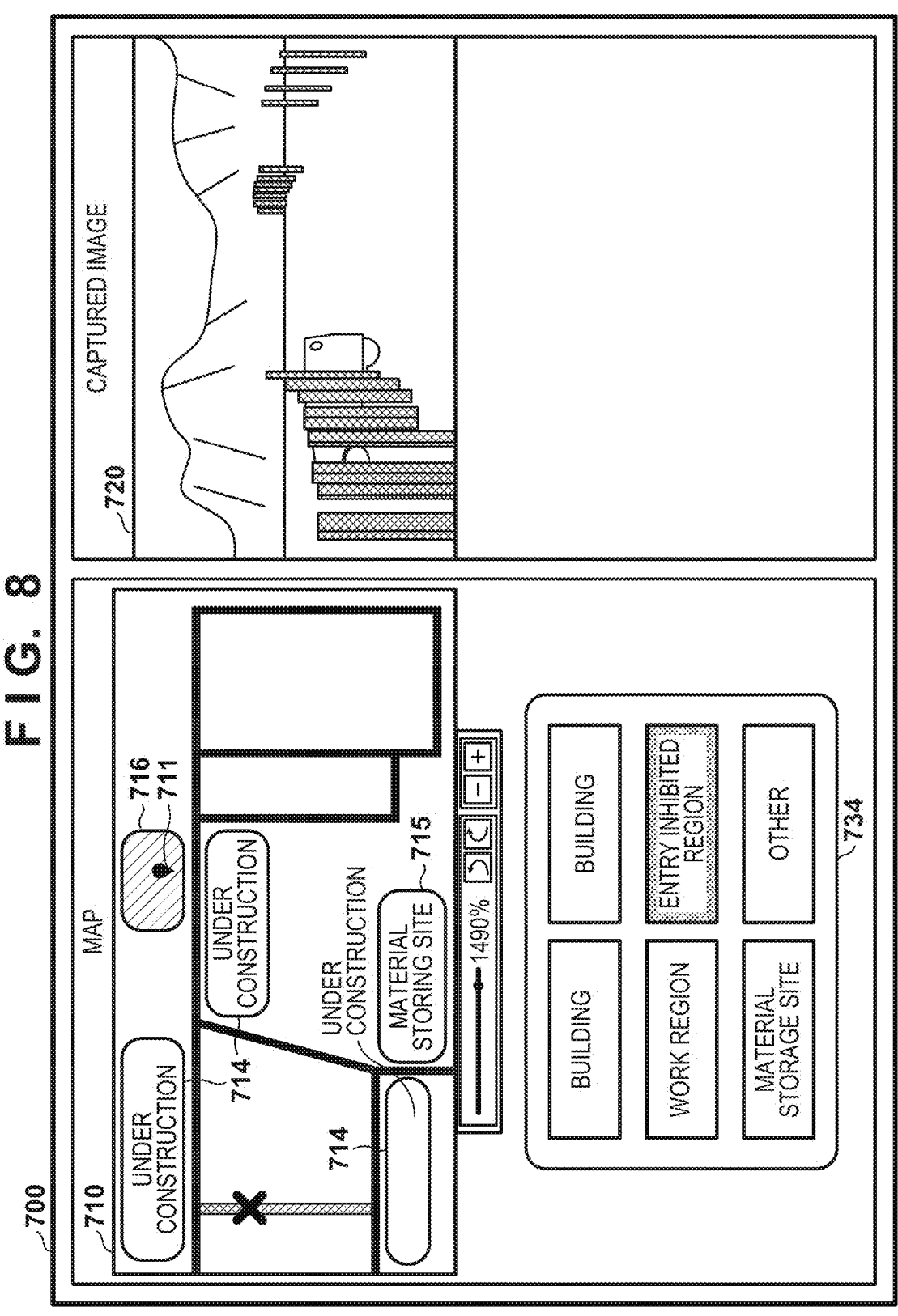

F I G. 9
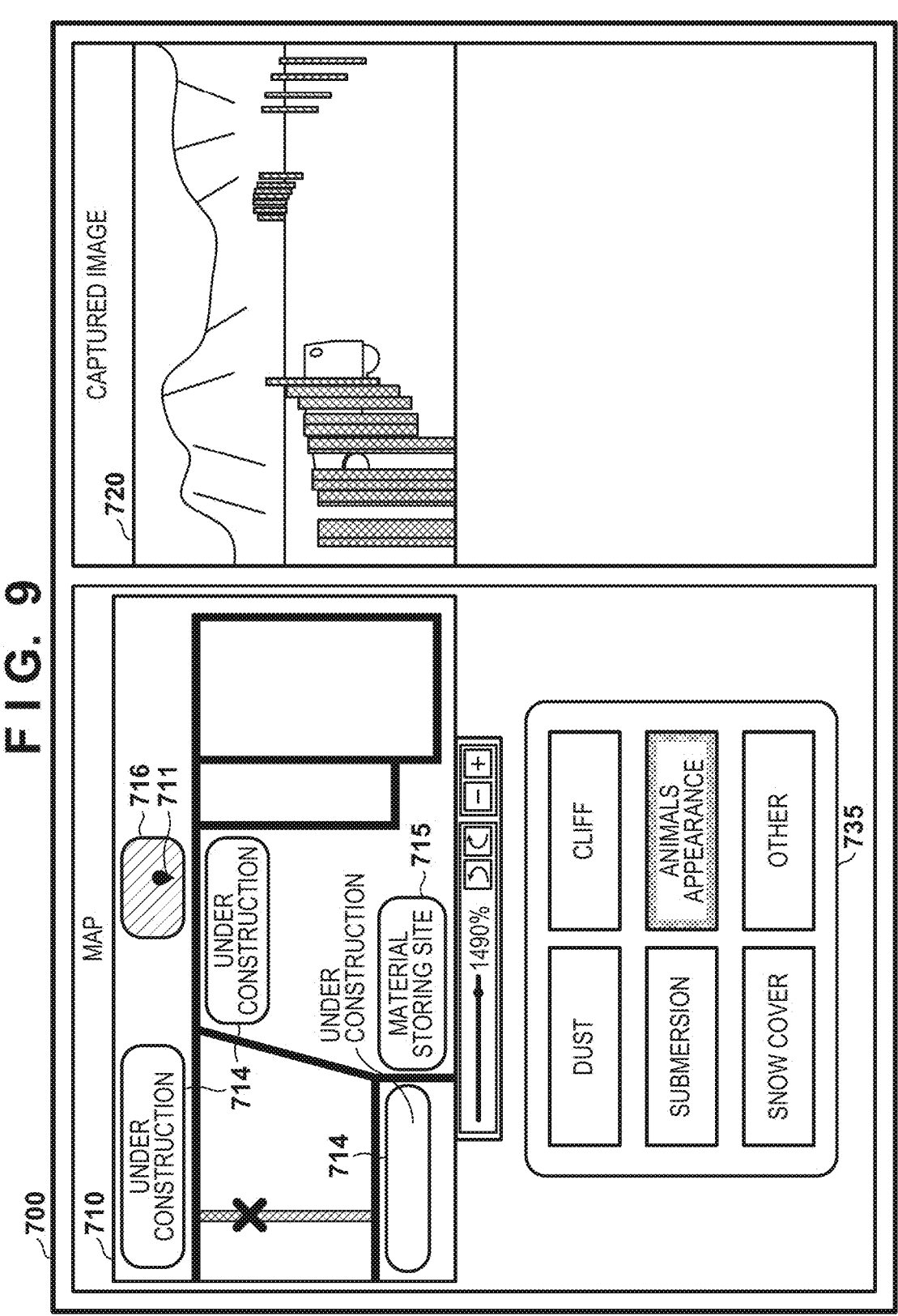

F I G. 11
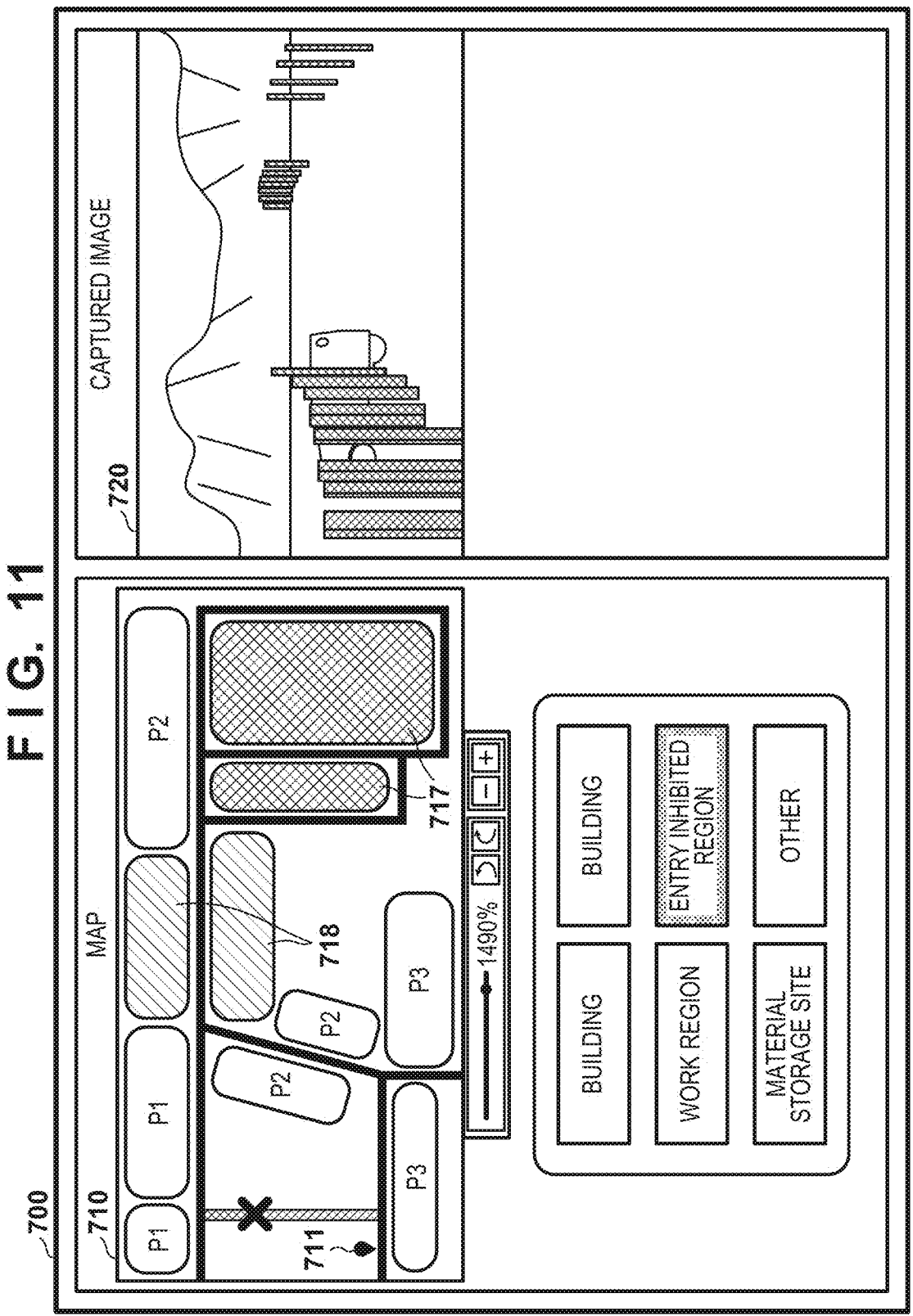

SERVER DEVICE, CONTROL METHOD THEREFOR, MAP CREATION SYSTEM, AND STORAGE MEDIUM

CROSS-REFERENCE TO RELATED APPLICATION(S)

This application is a continuation of International Patent Application No. PCT/JP2022/015376 filed on Mar. 29, 2022, the entire disclosure of which is incorporated herein by reference.

BACKGROUND OF THE INVENTION

Field of the Invention

The present invention relates to a server device for updating map data by using a terminal device that remotely operates a mobile object, a control method therefor, a map creation system, and a non-transitory storage medium.

Description of the Related Art

In a work site such as a building work site with a relatively large work area, map data of the work area needs to be created in advance in order to use an autonomous traveling type carriage for transporting materials (supplies). In addition, it is necessary to update the map data in accordance with a change in the daily state in the work area such that such a carriage can autonomously travel in the work area. Japanese Patent Laid-Open No. 2004-213239 discloses a technique in which a work vehicle such as a combine harvester including various sensors such as a gyro sensor is operated in a farm, and local information regarding obstacles, harvested crops, and the like on the farm is input to a map on the basis of sensor information collected by using the sensors.

In the above-described conventional technique, an operator collects sensor information while operating a work vehicle such as a combine harvester, thereby processing map data. However, in order to update map data in accordance with a change in daily state in a work area, it is required that a map can be processed more easily and efficiently.

SUMMARY OF THE INVENTION

Therefore, one aspect of the present disclosure provides a technique for more easily and efficiently updating map data of an area where a mobile object moves by using a terminal device that remotely operates the mobile object.

According to one aspect of the present invention, there is provided a server device capable of communicating with a mobile object for which a remote operation is able to be performed and a terminal device that performs the remote operation for the mobile object, the server device comprising: a storage unit configured to store map data of an area in which the mobile object moves; an acquisition unit configured to acquire, from the mobile object, an image obtained by imaging surroundings of the mobile object with an imaging unit provided in the mobile object; a providing unit configured to provide, to the terminal device, screen data of an operation screen including a map based on the map data stored in the storage unit and the image acquired by the acquisition unit, the operation screen being for receiving a user operation for processing the map; and an update unit configured to acquire, from the terminal device, input data indicating an input through the operation screen displayed based on the screen data in the terminal device, and update the map data stored in the storage unit according to the input data.

According to the present disclosure, it is possible to more easily and efficiently update map data of an area where a mobile object moves by using a terminal device that remotely operates the mobile object.

BRIEF DESCRIPTION OF THE DRAWINGS

FIG. 1 is a schematic diagram illustrating a configuration example of a map creation system.

FIG. 2 is a block diagram illustrating a hardware configuration example of a carriage.

FIG. 5 is a block diagram illustrating a functional configuration example of a management server.

FIG. 6 is a flowchart illustrating a procedure of processing executed by a management server.

FIG. 7 is a diagram illustrating an example of an operation screen provided from the management server to the terminal device.

FIG. 8 is a diagram illustrating an example of an operation screen provided from the management server to the terminal device.

FIG. 9 is a diagram illustrating an example of an operation screen provided from the management server to the terminal device.

FIG. 11 is a diagram illustrating an example of an operation screen provided from the management server to the terminal device.

DESCRIPTION OF THE EMBODIMENTS

Figure 3:
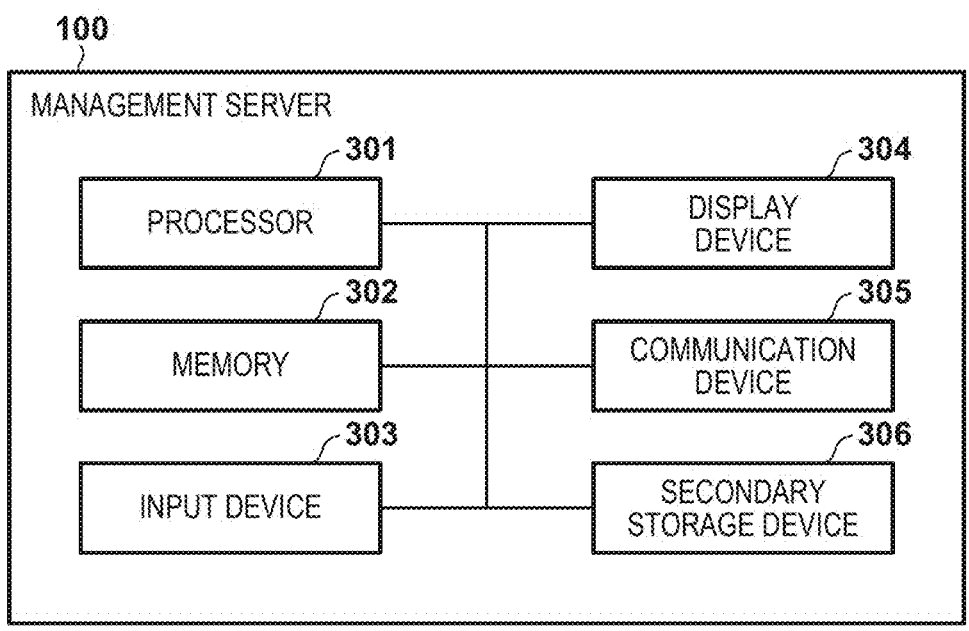
FIG. 3 is a block diagram illustrating a hardware configuration example of a management server.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

<System Configuration>

FIG. 1 is a schematic diagram illustrating a configuration example of a map creation system according to an embodiment of the present invention. Note that, in the following embodiment, a description will be made assuming that a mobile object is a vehicle (carriage), but the mobile object is not limited to a vehicle, and may be a flying object, a robot, or the like.

The map creation system of the present embodiment includes a management server 100, a terminal device 110, and a carriage 120. The management server 100, the terminal device 110, and the carriage 120 can communicate via a network 140. The network 140 includes one or more of networks such as the Internet, a mobile network (for example, LTE or 5G networks), and a local area network (LAN). The management server 100 can communicate with the terminal device 110 and the carriage 120 via the network 140. The terminal device 110 can communicate with the management server 100 and the carriage 120 via the network 140. Furthermore, the terminal device 110 and the carriage 120 may be capable of directly communicating without using the network 140.

The carriage 120 is a vehicle used for work performed in a work area 130. The carriage 120 is a carriage having a cargo bed for loading a material (supply), and can be used, for example, for transportation of a material from a material storage site to a work site in the work area 130. The work area 130 is an area (site) in which predetermined work such as building, construction, snow removal, lawn mowing, grass cutting, agriculture, or transportation is performed. In the following description, it is assumed that the work area 130 is a building site where building work is performed. In the work area 130, one carriage 120 may be used, or a plurality of carriages 120 may be used.

The carriage 120 can be remotely operated by an external device such as the terminal device 110. In addition, the carriage 120 can move autonomously along a route on the map toward the target point on the basis of the map data provided from the management server 100. As described above, the carriage 120 is configured to be switchable between a remote operation mode in which the carriage moves through a remote operation and an autonomous traveling mode in which the carriage autonomously moves. Note that the carriage 120 may be further operable by a person.

Each carriage 120 in the work area 130 is used not only for work (building work) in the work area 130 but also for creating or processing (editing) a map of the work area 130. Map data is managed by the management server 100. When used for creating or processing the map data, the carriage 120 moves in the work area 130 through a remote operation for the terminal device 110. The creation or processing of the map data managed by the management server 100 is performed while the terminal device 110 remotely operates the carriage 120 that is not used for work (building work) in the work area 130.

The management server 100 is a server that manages the carriage 120 and manages the map data of the work area 130. The management server 100 further manages registration information of a user who performs map creation or processing work by operating the terminal device 110. The management server 100 manages a work history of the map creation or processing work for each user included in the registration information. In addition, the management server 100 may collect and store a travel history of the carriage 120 in the work area 130.

The terminal device 110 is a device for operating the carriage 120 from a remote place. The terminal device 110 may be configured as a dedicated terminal, or may be configured as a computer terminal such as a personal computer (PC) or a tablet terminal. An operation of the carriage 120 using the terminal device 110 may be any operation, and may include, for example, traveling of the carriage 120. Specifically, the terminal device 110 may acquire parameters (for example, a steering angle, an accelerator pedal opening, and a brake pedal opening) related to an operation of the carriage 120 from the user and transmit the parameters to the carriage 120. The carriage 120 may be operable according to the operation parameters received from the terminal device 110.

Note that the remote operation for the carriage 120 using the terminal device 110 may be used in the following cases other than the case of performing map creation or processing work in the present embodiment.

A case where the carriage 120 is restored from a temporary abnormal state (for example, a state in which a positioning sensor stops functioning due to the carriage being in the shadow of an object, losing its own position, and coming to an emergency stop, or a state in which the carriage is in an emergency stop due to jumping out of an animal) through a manual operation based on a remote operation A case where a manual operation is performed on the basis of a remote operation at a blind spot, an intersection, or a narrow road (a case where, for example, in such a place, the carriage 120 temporarily stops and a setting for switching from the autonomous traveling mode to the remote operation mode is performed)

A case where the advance instruction is given to the carriage 120 stopping at an intersection A case where, when the carriage 120 traveling in the autonomous traveling mode detects an obstacle and stops, the carriage 120 is instructed to pass through a road or a region while avoiding the obstacle A case where the software update of the carriage 120 is performed, or a case where a change of a transportation plan of materials (supplies) using the carriage 120 is permitted <Configuration of Carriage>

FIG. 2 is a block diagram illustrating a hardware configuration example of the carriage 120. The carriage 120 includes, as hardware constituents, a processor 201, a memory 202, a drive device 203, a braking device 204, a steering device 205, an imaging device 206 (imaging unit), a positioning sensor 207, and a communication device 208.

The processor 201 controls the overall operation of the carriage 120. The processor 201 may be configured by, for example, a central processing unit (CPU). The processor 201 may be a single processor, or may be a set of a plurality of processors communicatively connected to each other. The memory 202 stores programs and data used for processing of the carriage 120. The memory 202 may be configured by, for example, a combination of a random access memory (RAM) and a read-only memory (ROM).

The drive device 203 is a device for driving the carriage 120, and may be, for example, an engine and a motor. The braking device 204 is a device for braking the carriage 120, and may be, for example, a disc brake. The steering device 205 is a device for changing an advancing direction of the carriage 120, and may be, for example, a tie rod, a steering knuckle, or a steering arm.

The imaging device 206 (imaging unit) is a device for imaging the surroundings (for example, the front) of the carriage 120, and may be, for example, a camera. The carriage 120 may include one or more imaging devices 206. The positioning sensor 207 is a sensor for measuring a geographical position of the carriage 120, and may be, for example, a global navigation satellite system (GNSS) sensor. The communication device 208 is a device for communicating with a device outside the carriage 120. The communication device 208 may be a wireless communication module including an antenna for performing wireless communication and a baseband processing circuit.

<Configurations of Management Server and Terminal Device>

FIG. 3 is a block diagram illustrating a hardware configuration example of the management server 100. The management server 100 includes a processor 301, a memory 302, an input device 303, a display device 304, a communication device 305, and a secondary storage device 306 as hardware constituents.

The processor 301 controls the overall operation of the management server 100. The processor 301 may include, for example, a CPU. The processor 301 may be a single processor, or may be a set of a plurality of processors communicatively connected to each other. The memory 302 stores programs and data used for processing of the management server 100. The memory 302 may be configured by, for example, a combination of a RAM and a ROM.

The input device 303 is a device for acquiring an instruction from a user of the management server 100. The input device 303 may include, for example, a combination of one or more of a keyboard, a button, a touch pad, and a microphone. The display device 304 is a device for visually presenting information to the user of the management server 100. The display device 304 may be, for example, a dot matrix display such as a liquid crystal display. The management server 100 may have a device (for example, a touch screen) in which the input device 303 and the display device 304 are integrally configured.

The communication device 305 is a device for communicating with a device outside the management server 100. In a case where the management server 100 performs wired communication, the communication device 305 may be a network interface card (NIC) having a connector for connecting a cable. In a case where the management server 100 performs wireless communication, the communication device 305 may be a wireless communication module including an antenna and a baseband processing circuit.

The secondary storage device 306 is a device for storing data used for processing of the management server 100 in a nonvolatile manner. The secondary storage device 306 is configured by, for example, a hard disk drive (HDD) or a solid-state drive (SSD).

Figure 4:
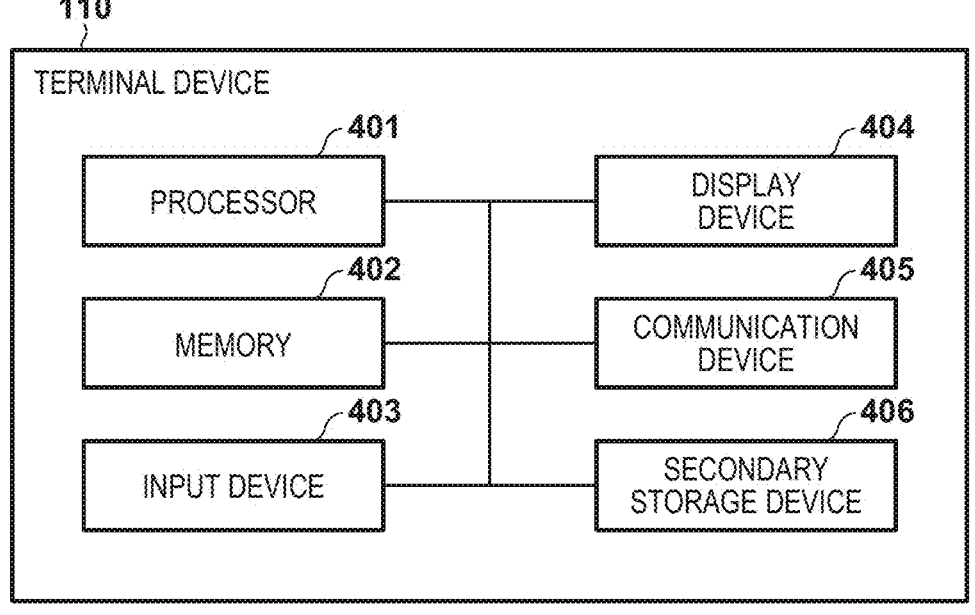
FIG. 4 is a block diagram illustrating a hardware configuration example of a terminal device.

FIG. 4 is a block diagram illustrating a hardware configuration example of the terminal device 110. Similarly to the management server 100 described above, the terminal device 110 includes, as hardware constituents, a processor 401, a memory 402, an input device 403, a display device 404, a communication device 405, and a secondary storage device 406. However, the input device 403 of the terminal device 110 may include a steering wheel, a joystick, an accelerator pedal, a brake pedal, and the like.

<Functional Configuration of Management Server>

FIG. 5 is a block diagram illustrating a functional configuration example of the management server 100. Each functional block of the management server 100 may be realized by the processor 301 operating according to a command of a program stored in the memory 302. Alternatively, some or all of the functional blocks in FIG. 5 may be realized by a dedicated circuit such as an application specific integrated circuit (ASIC).

The management server 100 includes a map management unit 501, an image acquisition unit 502, a screen providing unit 503, an input acquisition unit 504, and a map update unit 505. FIG. 5 illustrates a function for updating map data stored in the secondary storage device 306 according to input data acquired from the terminal device 110, but the terminal device 110 may further have a function not illustrated.

The map management unit 501 manages map data of an area (work area 130) where the carriage 120 moves while storing the map data in the secondary storage device 306. The image acquisition unit 502 acquires, from the carriage, an image (captured image) obtained by imaging the surroundings of the carriage with the imaging device 206 provided in the carriage 120 that is an operation target of the terminal device 110. For example, the carriage 120 transmits the captured image obtained by the imaging device 206 to the management server 100 in real time, and the image acquisition unit 502 receives the captured image.

The screen providing unit 503 generates screen data of an operation screen that includes a map based on the map data stored in the secondary storage device 306 and the captured image acquired by the image acquisition unit 502 and is used for receiving a user operation for processing the map. The screen providing unit 503 provides (transmits) the generated screen data to the terminal device 110 such that the user can process the map while performing the remote operation for the carriage 120 on the terminal device 110.

The input acquisition unit 504 acquires, from the terminal device 110, input data indicating an input by the user via the operation screen displayed on the terminal device 110 on the basis of the screen data provided by the screen providing unit 503. The map update unit 505 updates the map data stored in the secondary storage device 306 according to the input data acquired by the input acquisition unit 504.

<Outline of Map Creation or Processing Work>

The user of the terminal device 110 accesses the management server 100 by using the terminal device 110 to perform an operation for work of creating or processing a map of the work area 130. For example, the user starts an application (dedicated application or web browser) installed in the terminal device 110, and logs in to the management server 100 by using the application. The management server 100 stores, in the secondary storage device 306, registration information of the user who operates the terminal device 110 to perform map creation or processing work, and performs login processing on the basis of the registration information.

The management server 100 provides the application of the terminal device 110 with a remote user interface (remote UI) for the map creation or processing work via the network 140. The management server 100 notifies the user who logs in to the management server 100 of information indicating a target of the work to be performed by the user of the terminal device 110, for example, materials, a work time, and the carriage 120 that is an operation target via the remote UI.

The user of the terminal device 110 starts a remote operation on the carriage 120 that is an operation target and work of creating or processing a map of the work area 130 on the basis of the information sent via the remote UI. The management server 100 provides an operation screen including an image captured by the carriage 120 to the terminal device 110 used for map creation or processing work via the remote UI, and acquires input data indicating an input through the operation screen from the terminal device 110. The management server 100 updates the map data according to the acquired input data.

The map processing work will be described below, but the map creation work can be similarly realized. The map creation work is work of creating a new map of the work area 130. The map creation work includes work of disposing roads or regions on a map displayed on the operation screen and inputting information regarding the disposed roads or regions while moving the carriage 120 in the work area 130 through a remote operation. The map processing work is work of processing a created map in response to daily or temporary changes in states in the work area 130. The map processing work includes, for example, the following work.

Setting of temporary impassable areas (roads or areas) due to severe inclement weather (for example, the occurrence of a tornado)

Setting of temporary impassable areas due to the appearance of large animals, or setting of temporary impassable areas with evictions of animals from such areas Setting of temporary impassable areas due to accidents or construction work Setting of inaccessibility for an area in which a plant is growing, the plant being detected as an obstacle by the carriage 120 during autonomous traveling Setting of a speed limit for a road in a rough state due to the carriage 120 frequently coming and going or the passage of time In addition, the map processing work performed by the user of the terminal device 110 may be performed on the basis of the travel history of the carriage 120 stored in the management server 100 in addition to being performed on the basis of the image captured by the carriage 120, displayed on the operation screen. For example, among places other than an intersection, a place where the number of times the carriage 120 stops (for example, an emergency stop, a stop due to an obstacle, or a stop due to a stack caused by unevenness) is large (for example, the stop is measured a predetermined number of times or more within a certain period of time) may be set as an impassable area or a caution area. In that case, for example, the terminal device 110 may acquire the travel history of the carriage 120 from the management server 100 via the remote UI according to a user operation using the input device 403, and present the travel history to the user by using the display device 404.

<Processing Procedure>

An example of processing executed by the management server 100 will be described with reference to FIG. 6. FIG. 6 is a flowchart illustrating a procedure of processing executed by the management server 100.

The process in each step in FIG. 6 may be executed by the processor 301 operating according to a command of a program stored in the memory 302. Alternatively, some or all of the steps in FIG. 6 may be executed by a dedicated circuit such as an ASIC. As described above, the processing according to the procedure in FIG. 6 is started by the management server 100 in response to performing a user operation for starting the map processing work in the terminal device 110.

In S601, the image acquisition unit 502 (processor 301) acquires, from the carriage, a captured image obtained by imaging the surroundings of the carriage with the imaging device 206 provided in the carriage 120 that is an operation target of the terminal device 110, and the processing proceeds to S602. In step S602, the screen providing unit 503 (processor 301) generates screen data of an operation screen including a map based on the map data stored in the secondary storage device 306 and the captured image acquired by the image acquisition unit 502, the operation screen being for receiving a user operation for processing the map. Further, in S603, the screen providing unit 503 (processor 301) provides (transmits) the generated screen data to the terminal device 110 such that the map can be processed while a remote operation for the carriage 120 is performed in the terminal device 110, and the processing proceeds to S604.

In S604, the input acquisition unit 504 (processor 301) acquires, from the terminal device 110, input data indicating an input through the operation screen displayed on the terminal device 110 on the basis of the screen data provided in S603, and the processing proceeds to S605. In S605, the map update unit 505 (processor 301) updates the map data stored in the secondary storage device 306 according to the input data acquired in S604. Thereafter, the processing returns to S601, and the processes in S601 to S605 are repeatedly performed in the management server 100 while the map processing work is continued by the user in the terminal device 110.

For each user included in the registration information stored in the secondary storage device 306, the management server 100 may evaluate a skill level for the processing work for the map using the terminal device 110 on the basis of the work history of the processing work, and store an evaluation result in association with the registration information. The evaluation of the skill level may include, for example, evaluation based on an accumulated time of the processing work, evaluation based on a length of a road on which the processing has been performed and a size of the region, point addition evaluation based on the processing work at night or in bad weather where a remote operation for the carriage 120 can be difficult, and feedback evaluation of the performance for the map by a work requester. In addition, the presence or absence of participation in a training course for teaching local rules at a work site corresponding to the work area 130, the pass or fail of a test in the training course, and the like may also be considered in the evaluation of the skill level. Such evaluation of the skill level for the processing work of the user enables a business operator who performs work (building work) in the work area 130 to refer to the skill level for the processing work of each user, for example, when selecting a user to whom the work of processing the map of the work area 130 is entrusted. Furthermore, a time period in which the user can perform work may be stored in association with the registration information. As a result, when selecting a user, the business operator can entrust the user with the processing work for the map even in a midnight period in which work (building work) is not performed, for example, and thus, it is possible to easily and effectively create a map by further utilizing the advantage of map creation based on a remote operation.

FIG. 7 illustrates an example of an operation screen provided from the management server 100 to the terminal device 110 in S603 and displayed on the display device 404 of the terminal device 110. An operation screen 700 includes a region 710 in which a map of the work area 130 is displayed, and a region 720 in which one frame image of the captured image acquired from the carriage 120 is displayed. The captured image displayed in the region 720 is an image obtained by imaging, with the imaging device 206, the front of the carriage 120 on which a remote operation using the terminal device 110 is performed. As an example, the captured image includes an image of another carriage 721 that is turning left in front of the carriage 120 and an image of a pile 722 that defines a road on which the carriage 120 is traveling.

As illustrated in FIG. 7, the captured image acquired by the image acquisition unit 502 from the carriage 120 is provided to the terminal device 110 in a state of being disposed in a part (region 720) of the operation screen provided to the terminal device 110 by the screen providing unit 503. As described above, the captured image transmitted from the carriage 120 to the management server 100 is relayed to the terminal device 110 by the management server 100.

The screen providing unit 503 displays the captured image acquired from the carriage 120 in the region 720, generates screen data of an operation screen for simultaneously displaying a map (and an operation object) in a region 710 (for example, a region adjacent to the region 720) different from the region 720, and provides the generated screen data to the terminal device 110. The user of the terminal device 110 performs a remote operation on the carriage 120 by using the input device 403 (for example, a joystick) while checking a current position 711 of the carriage 120 that is an operation target and the captured image in the region 720, which are indicated on the map in the region 710. Furthermore, the user of the terminal device 110 performs a user operation for processing the map in the region 710 through an operation on the map and operation objects 731 to 733 while checking the captured image in the region 720. The terminal device 110 transmits input data corresponding to the user operation received on the operation screen 700 to the management server 100.

As described above, according to the present embodiment, by providing an operation screen such as the operation screen 700 from the management server 100 to the terminal device 110, the user can process the map corresponding to the map data on the basis of the captured image while performing a remote operation on the carriage 120 from a remote place by using the terminal device 110. As described above, it is possible to more easily and efficiently update the map data of the area where the carriage 120 moves by using the terminal device 110 that remotely operates the carriage 120 (mobile object).

In one embodiment, the screen providing unit 503 configures an operation screen to be provided to the terminal device 110 such that a user operation for selecting a road or a region on a map included in the operation screen and adding information to the selected road or region can be received. For example, the screen providing unit 503 configures an operation screen such that a user operation for adding information affecting passage of the carriage 120 (mobile object) in the selected road or region can be received.

The operation screen 700 is configured such that, in a case where a road is selected on the map in the region 710, information affecting passage of the carriage 120 as follows can be set as information to be added to the selected road.

Setting of a passage direction (whether or not passage is one-way passage and a direction in which passage is permitted in the case of one-way passage)

Setting of temporary stop location (blind intersection or the like)

Setting of a speed limit

Setting of unevenness of a road

Setting of a road width (for example, whether or not two or more carriages 120 can pass through a road)

Setting of a temporary evacuation place (a place for avoidance at the time of passing each other or the occurrence of an accident on a narrow road)

Setting of temporary passage possibility

As an example, in the example in FIG. 7, "impassable" is set for the road 713, and the road 713 is displayed such that it is distinguishable. As described above, the screen providing unit 503 displays the map on the operation screen 700 such that it is possible to distinguish whether or not each of the roads on the map has been processed.

Further, in the example in FIG. 7, a user operation for selecting a new road 712 on the map in the region 710, selecting "passage possibility" as a setting item by using the operation object 731, and selecting "impassable" as a setting content by using the operation object 732 is performed on the road 712. Note that roads other than the roads 712 and 713 are set to be passable. As described above, the information that can be set by using the operation screen 700 and affects passage of the carriage 120 may include information indicating a restriction on the passage of the carriage 120. In addition, the information affecting the passage of the carriage 120 may further include information indicating a scheduled release time of such restriction.

The operation screen 700 is further configured to be able to receive a user operation for adding information indicating a reason for "impassable" with regard to the road set to be "impassable". Examples of the reason the road is impassable include the occurrence of obstacles (tall plants, large rocks, large animals, and the like) or weather (tornado, dust, mud or puddle due to rain, snow cover, and the like). In the example in FIG. 7, a user operation for selecting "obstacle" is performed as the reason for "impassable" by using the operation object 733.

FIG. 8 illustrates an example in which a region is selected on the map in the region 710 of the operation screen 700. In this example, an operation object 734 for receiving a user operation for adding information affecting passage of the carriage 120 in the selected region is displayed in response to the user operation for selecting the region 715 on the map. In a case where a region is selected on the map in the region 710, the operation screen 700 is configured to be able to set information affecting the passage of the carriage 120 as follows as information to be added to the selected region.

Whether or not entry into the region is possible, or setting of a condition that entry into the region is possible (for example, since there is unevenness on the ground, a vehicle can enter only when a load is not loaded, or only a vehicle having a predetermined vehicle height or vehicle width or less can enter)

Setting of a building (for example, the type of building)

Setting of being under construction (for example, an area under construction and scheduled work completion date and time).

Setting of a material storage site (a start point and a goal point of transportation using the carriage 120)

Setting of a plant area (a weed or tree planting area, the type of plant and a growth degree thereof, and the like)

Setting of areas requiring attention to the appearance of animals

As described above, the information affecting the passage of the carriage 120 in the road or the region on the map may include whether or not the carriage 120 can enter the road or the region or a condition that the carriage 120 can enter the road or region.

As an example, in the example in FIG. 8, "under construction" is set for the region 714, "material storage site" is set for the region 715, and the regions 714 and 715 are displayed such that the settings are distinguishable from each other. As described above, the screen providing unit 503 displays the map on the operation screen 700 such that it is possible to distinguish whether or not each of the roads or the regions on the map has been processed. As a result, the user of the terminal device 110 can easily ascertain whether or not each of the roads or the regions on the map has been processed when performing processing work for the map. As a result, for example, the user of the terminal device 110 can process the map with priority given to an unprocessed road or region.

Furthermore, in the example in FIG. 8, a user operation for selecting a new region 716 on the map in the region 710, and selecting "entry inhibited region" as a setting item by using the operation object 734 is performed on the region 716. In this case, as illustrated in FIG. 9, the operation object 734 in the operation screen 700 is switched to an operation object 735 for setting information indicating a reason for "entry inhibited region" with regard to the region set to "entry inhibited region". In the example in FIG. 9, "animals appearance" is selected as the reason the region 715 is an "entry inhibited region".

Figure 10:
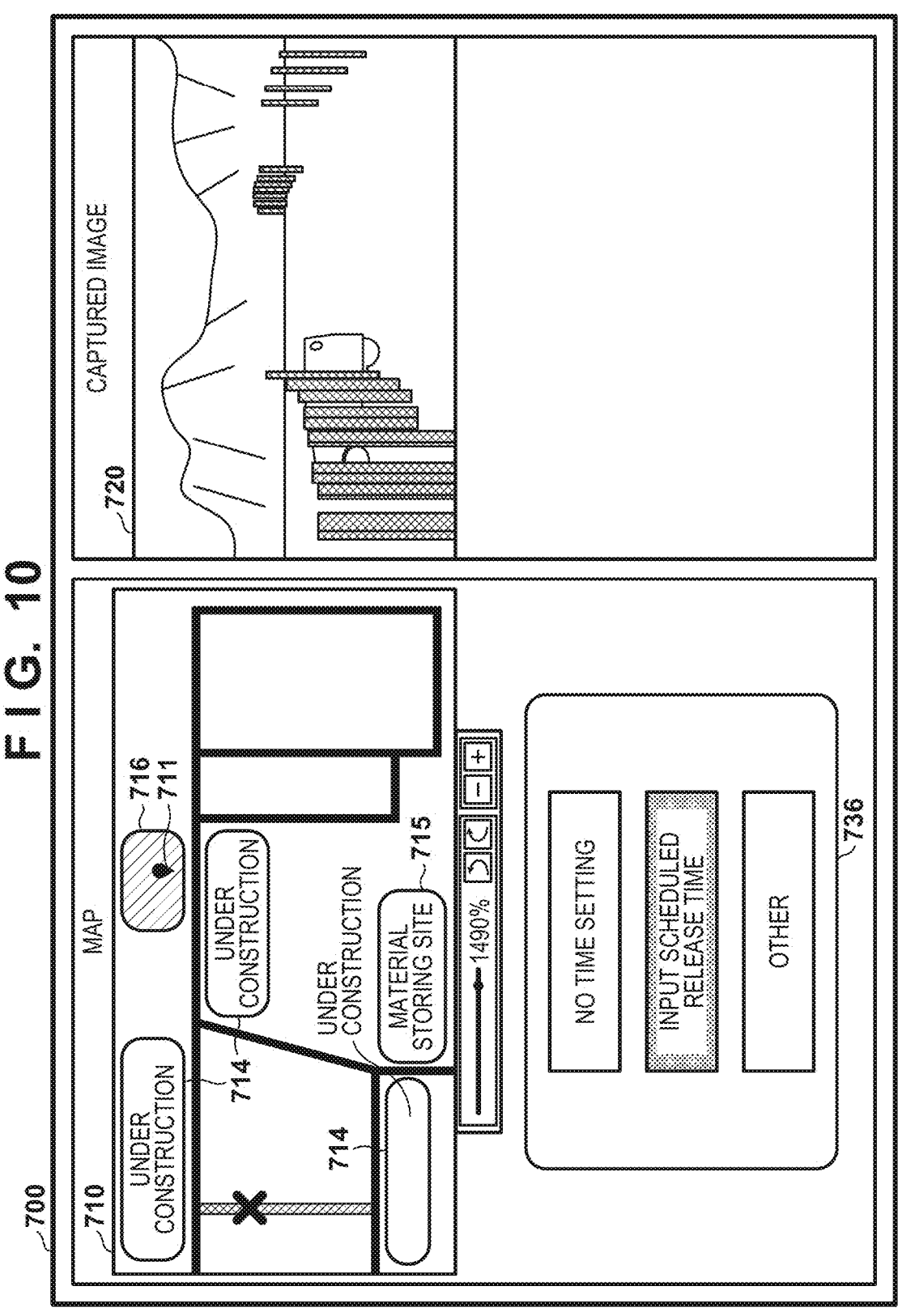
FIG. 10 is a diagram illustrating an example of an operation screen provided from the management server to the terminal device.

In this case, as illustrated in FIG. 10, the operation object 735 in the operation screen 700 is switched to an operation object 736 used for setting a scheduled release time. As described above, the operation screen 700 may be configured to be able to further set the scheduled release time of the restriction with regard to the region to which the restriction of "entry inhibited region" is set.

As described above, by making it possible to add information affecting the passage of the carriage 120 to each of the roads or the regions on the map by using the operation screen 700, such information can be used for the operation of the carriage 120 for work (building work) in the work area 130. In addition, it is possible to more efficiently perform processing work for the map by using such information.

In one embodiment, the screen providing unit 503 may display the map on the operation screen provided to the terminal device 110 such that it is possible to distinguish whether or not work (building work) is being performed on each of roads or regions on the map. In the example in FIG. 11, a region 717 in which work is performed and a region 718 in which work is not performed are displayed on the map in the region 710 of the operation screen 700 such that the regions are distinguishable from each other and also distinguishable from other regions. As a result, for example, it is possible to provide a notification to the user of the terminal device 110 such that the carriage 120 for building work can preferentially enter a region where no work is performed and the carriage 120 for map creation or processing does not enter the region. Therefore, it is possible to prevent a user who operates the carriage 120 for map processing by using the terminal device 110 from causing the carriage to enter a region where work (building work) is being performed and interfering with the work.

In one embodiment, the screen providing unit 503 may further display the map on the operation screen provided to the terminal device 110 such that the processing priority set for each of the roads or the regions on the map can be identified. In the example in FIG. 11, the processing priority of each region is displayed in an identifiable manner by numerical values P1 to P3. For example, a smaller numerical value indicates a higher priority (that is, P1 has the highest priority). Note that the processing priority of each region may be displayed according to another display method, and for example, the processing priority of each region may be displayed in a distinguishable manner using the shade of color of the region on the map. As a result, the user who operates the carriage 120 for map processing using the terminal device 110 can ascertain the processing priority of each region on the map. Therefore, the user of the terminal device 110 can move the carriage 120 to each region in descending order of priority and perform work of processing the region.

Setting of the processing priority for each of roads or regions on the map is performed, for example, as follows. The map data stored in the secondary storage device 306 may include information indicating a start time of work (building work) on each of roads or regions on the map. In this case, the screen providing unit 503 may set the priority of each of roads or regions on the map to be higher as the time until the start time becomes shorter. As a result, for example, in a night time period in which building work is not performed, it is possible to preferentially perform processing work for the map for a region in which building work is performed on the next day. As a result, the carriage 120 for the building work can be operated by using the latest map data for an area where the building work is performed.

The map data stored in the secondary storage device 306 may include information indicating a start time and an end time of work (building work) on each of roads or regions on the map. In this case, the screen providing unit 503 may set, on the basis of the work time period from the start time to the end time of the work in each of the roads or regions on the map, the priority of a road or a region where the work is not performed higher than the priority of a road or a region where the work is performed on the map. As a result, for example, in the daytime time period in which building work is performed, it is possible to preferentially perform processing work for the map for a region in which building work is not performed. Therefore, it is possible to prevent a user who operates the carriage 120 for map processing by using the terminal device 110 from causing the carriage to enter the region where the building work is being performed and interfering with the work.

Figure 12:
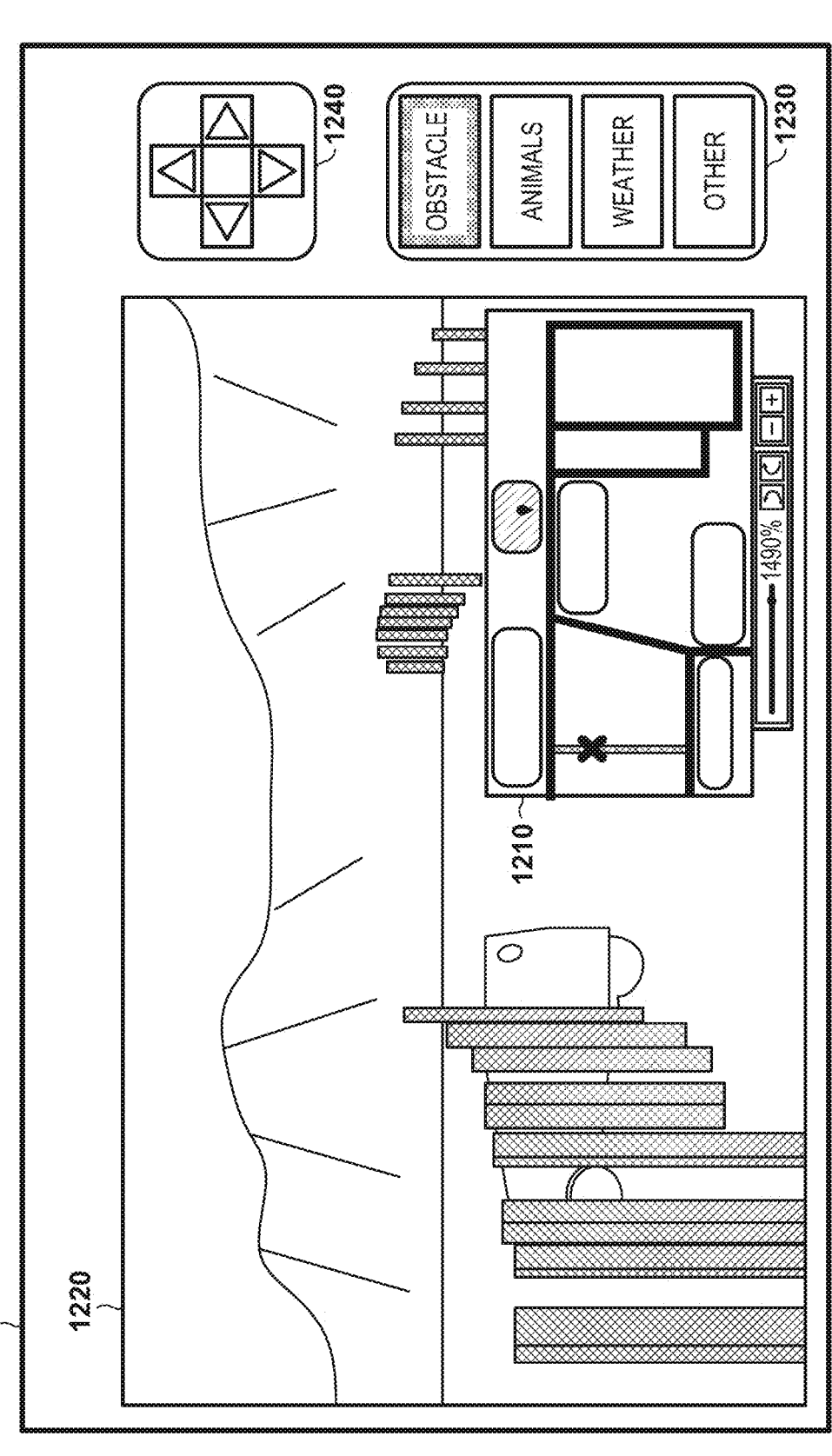
FIG. 12 is a diagram illustrating an example of an operation screen provided from the management server to the terminal device.

In one embodiment, the screen providing unit 503 may configure an operation screen such that the map is displayed to be superimposed on a partial region of the captured image acquired from the carriage 120 by the image acquisition unit 502. For example, an operation screen 1200 illustrated in FIG. 12 is configured to display a map to be superimposed on a partial region 1210 of the captured image displayed in the region 1220. Furthermore, for example, in a case where the terminal device 110 is a PC, a tablet terminal, or the like, the screen providing unit 503 may configure the operation screen 1200 to display an operation object 1230 for receiving a user operation for adding information to a road or a region selected on the map, and an operation object 1240 for receiving a remote operation for the carriage 120. In a case where the terminal device 110 is a PC, an operation using the operation object 1240 can be performed through, for example, a mouse operation. In a case where the terminal device 110 is a tablet terminal, an operation using the operation object 1240 can be performed through, for example, a touch operation.

As described above, the management server 100 (server device) of the above-described embodiment includes the secondary storage device 306 in which the map data of the area where the carriage 120 moves is stored. The image acquisition unit 502 acquires, from the carriage, an image (captured image) obtained by imaging the surroundings of the carriage with the imaging device 206 provided in the carriage 120 that is an operation target of the terminal device 110. The screen providing unit 503 provides the terminal device 110 with screen data of an operation screen for receiving a user operation for processing the map such that the map can be processed while a remote operation for the carriage 120 is performed in the terminal device 110. The operation screen includes a map based on map data stored in the secondary storage device 306 and a captured image acquired by the image acquisition unit 502. The input acquisition unit 504 acquires, from the terminal device 110, input data indicating an input by the user through the operation screen displayed on the terminal device 110 on the basis of the screen data provided by the screen providing unit 503. The map update unit 505 updates the map data stored in the secondary storage device 306 according to the input data acquired by the input acquisition unit 504.

As described above, according to the above-described embodiment, a user can process the map corresponding to the map data on the basis of the captured image while performing a remote operation for the carriage 120 from a remote place by using the terminal device 110. As described above, it is possible to more easily and efficiently update the map data of the area where the carriage 120 moves by using the terminal device 110 that performs a remote operation for the carriage 120.

Modification Examples

In the above-described embodiment, an example in which the terminal device 110 and the carriage 120 perform communication via the management server 100 has been described, but the terminal device 110 and the carriage 120 may directly perform communication without using the management server 100. In this case, the screen providing unit 503 of the management server 100 provides the terminal device 110 with screen data of an operation screen including a map based on the map data stored in the secondary storage device 306, the operation screen being for receiving a user operation for processing the map, so that the map can be processed while a remote operation for the carriage 120 is performed in the terminal device 110.

The terminal device 110 acquires, from the carriage, a captured image obtained by imaging the surroundings of the carriage with the imaging device 206 provided on the carriage 120. The terminal device 110 causes the captured image acquired from the carriage 120 to be included in the operation screen on the basis of the screen data provided from the management server 100, displays the operation screen on the display device 404, and transmits input data corresponding to the user operation received on the operation screen to the management server 100. The map update unit 505 of the management server 100 updates the map data stored in the secondary storage device 306 according to the input data indicating the input through the operation screen, received from the terminal device 110.

According to such an embodiment, similarly to the above-described embodiment, it is possible to more easily and efficiently update the map data of the area where the carriage 120 moves by using the terminal device 110 that remotely operates the carriage 120.

Summary of Embodiments

The above embodiments disclose at least the following embodiments.
<Item 1>
A server device (100) capable of communicating with a mobile object (120) for which a remote operation is able to be performed and a terminal device (110) that performs the remote operation for the mobile object, the server device comprising:

storage means for storing map data of an area in which the mobile object moves;
　　acquisition means (502) for acquiring, from the mobile object, an image obtained by imaging surroundings of the mobile object with an imaging unit (206) provided in the mobile object;
　　providing means (503) for providing, to the terminal device, screen data of an operation screen including a map based on the map data stored in the storage means and the image acquired by the acquisition means, the operation screen being for receiving a user operation for processing the map; and
　　update means (504, 505) for acquiring, from the terminal device, input data indicating an input through the operation screen displayed based on the screen data in the terminal device, and updating the map data stored in the storage means according to the input data.

According to this item, it is possible to more easily and efficiently update the map data of the area where the mobile object moves by using the terminal device that remotely operates the mobile object.
<Item 2>
The server device according to Item 1, wherein the providing means configures the operation screen such that a user operation for selecting a road or a region on the map included in the operation screen and adding information to the selected road or region is able to be received.

According to this item, the user of the terminal device becomes possible to process the map data by adding information to the road or the region selected on the map.
<Item 3>
The server device according to Item 1 or 2, wherein the providing means configures the operation screen such that a user operation for selecting a road or a region on the map included in the operation screen and adding information affecting passage of the mobile object in the selected road or region is able to be received.

According to this item, the user of the terminal device becomes possible to process the map data by adding information affecting passage of the mobile object to the road or the region selected on the map. In addition, such information can be used for an operation of the mobile object.
<Item 4>
The server device according to Item 3, wherein the information affecting the passage includes information indicating a restriction on the passage of the mobile object in the road or the region.

According to this item, the user of the terminal device becomes possible to process the map data by adding information indicating the restriction of passage of the mobile object to the road or the region selected on the map, and such information can be used for the operation of the mobile object.
<Item 5>
The server device according to Item 4, wherein the information affecting the passage further includes information indicating a scheduled release time of the restriction.

According to this item, the user of the terminal device becomes possible to process the map data by adding information indicating the scheduled release time of the restriction on passage of the mobile object to the road or the region selected on the map. In addition, such information can be used for an operation of the mobile object.
<Item 6>
The server device according to any one of Items 3 to 5, wherein the information affecting the passage includes whether or not the mobile object is able to enter the road or the region, or a condition that the mobile object is able to enter the road or the region.

According to this item, the user of the terminal device becomes possible to process the map data by adding whether or not the mobile object can enter the road or the region selected on the map or a condition that the mobile object can enter the road or the region. In addition, such information can be used for an operation of the mobile object.
<Item 7>
The server device according to any one of Items 1 to 6, wherein the providing means displays the map on the operation screen such that whether or not each of roads or regions on the map has been processed is distinguishable.

According to this item, the user of the terminal device becomes possible to easily ascertain whether or not each of the roads or the regions on the map has been processed when performing the processing work for the map. This enables, for example, the user of the terminal device to process the map with priority given to an unprocessed road or region.

<Item 8>

The server device according to any one of Items 1 to 7, wherein the map data indicates a map of a work area where a predetermined work is performed, and the providing means displays the map on the operation screen such that whether or not the work is being performed for each of roads or regions on the map is distinguishable.

According to this item, it is possible to prevent the user operating the mobile object for map processing by using the terminal device, from causing the mobile object to enter a region where work is being performed and interfere with the work.

<Item 9>

The server device according to any one of Items 1 to 8, wherein the providing means displays the map on the operation screen such that processing priorities set for respective roads or regions on the map are identifiable.

According to this item, the user operating the mobile object for map processing by using the terminal device becomes possible to ascertain the processing priority of each region on the map. Therefore, the user of the terminal device becomes possible to cause the mobile object to move to each region in descending order of priority and perform work of processing the region.

<Item 10>

The server device according to Item 9, wherein the map data indicates a map of a work area where a predetermined work is performed, and includes information indicating a start time of the work in each of roads or regions on the map, and the providing means sets a priority to be higher as a time until the start time becomes shorter for each of the roads or regions on the map.

According to this item, the mobile object can be operated by using the latest map data for the area where the work is performed.

<Item 11>

The server device according to Item 9 or 10, wherein the map data indicates a map of a work area where a predetermined work is performed, and includes information indicating a start time and an end time of the work in each of roads or regions on the map, and the providing means sets a priority to be higher for a road or a region where the work is not being performed than for a road or a region where the work is being performed on the map.

According to this item, it is possible to prevent the user operating the mobile object for map processing by using the terminal device from causing the mobile object to enter the region where work is being performed and interfering with the work.

<Item 12>

The server device according to any one of Items 1 to 11, wherein the providing means configures the operation screen to display an operation object for receiving a remote operation for the mobile object together with an operation object for receiving a user operation for adding information to a road or a region selected on the map.

According to this item, the user of the terminal device becomes possible to perform the remote operation for the mobile object together with the user operation for adding information to the road or the region selected on the map by using the operation screen.

<Item 13>

The server device according to any one of Items 1 to 12, wherein the providing means configures the operation screen such that the map is displayed to be superimposed on a partial region of the image.

According to this item, it is possible to effectively use the display region of the operation screen.

<Item 14>

The server device according to any one of Items 1 to 13, wherein the storage means stores registration information of a user who operates the terminal device, and the server device further comprises evaluation means for evaluating, for each user included in the registration information, a skill level for processing work for the map using the terminal device based on a work history of the processing work, and storing a result of the evaluation in association with the registration information.

According to this item, the business operator who performs the work in the work area can refer to the skill level for the processing work of each user, for example, when selecting the user to whom the work of processing the map of the work area is entrusted.

<Item 15>

The server device according to any one of Items 1 to 14, wherein the mobile object is configured to be able to be remotely operated and to be able to move autonomously based on the map data provided from the server device.

According to this item, the mobile object becomes possible to move independently on the basis of the updated map data.

<Item 16>

The server device according to Item 15, wherein the mobile object is a carriage having a cargo bed for loading a material.

According to this item, it is possible to more easily and efficiently update the map data of the area where the carriage moves by using the terminal device that remotely operates the carriage having the cargo bed for loading materials.

<Item 17>

A map creation system comprising: the server device according to any one of Items 1 to 16; a mobile object for which a remote operation is able to be performed; and a terminal device that performs the remote operation for the mobile object, wherein the terminal device includes remote operation means for performing the remote operation for the mobile object via the server device, display means for displaying the operation screen based on the screen data provided from the server device, and transmission means for transmitting, to the server device, the input data corresponding to a user operation received on the operation screen.

According to this Item, a map creating system for enabling map data of an area where a mobile object moves to be more easily and efficiently updated by using a terminal device that remotely operates the mobile object is provided.

<Item 18>

A map creation system comprising: a server device; a mobile object for which a remote operation is able to be performed; and a terminal device that performs the remote operation for the mobile object, wherein the server device includes storage means for storing map data of an area in which the mobile object moves, providing means for providing, to the terminal device, screen data of an operation screen including a map based on the map data stored in the storage means, the operation screen being for receiving a user operation for processing the map, and update means for updating the map data stored in the storage means in accordance with input data received from the terminal device and indicating an input through the operation screen, and the terminal device includes acquisition means for acquiring, from the mobile object, an image obtained by imaging surroundings of the mobile object with an imaging unit provided in the mobile object, display means for displaying the operation screen based on the screen data provided from the server device, the display means displaying the image acquired by the acquisition means by including the image in the operation screen, and transmission means for transmitting, to the server device, the input data corresponding to a user operation received on the operation screen.

According to this item, a map creating system for enabling map data of an area where a mobile object moves to be more easily and efficiently updated by using a terminal device that remotely operates the mobile object is provided.

<Item 19>

A control method for a server device capable of communicating with a mobile object for which a remote operation is able to be performed and a terminal device that performs the remote operation for the mobile object, and including storage means for storing map data of an area in which the mobile object moves, the control method comprising:

an acquisition step of acquiring, from the mobile object, an image obtained by imaging surroundings of the mobile object with an imaging unit provided in the mobile object;

a provision step of providing, to the terminal device, screen data of an operation screen including a map based on the map data stored in the storage means and the image acquired in the acquisition step, the operation screen being for receiving a user operation for processing the map; and an update step of acquiring, from the terminal device, input data indicating an input through the operation screen displayed based on the screen data in the terminal device, and updating the map data stored in the storage means according to the input data.

According to this item, it is possible to more easily and efficiently update the map data of the area where the mobile object moves by using the terminal device that remotely operates the mobile object.

<Item 20>

A program for causing a computer to execute each step of the control method for the server apparatus according to Item 19.

According to this item, the above items are provided in the form of a program.

The invention is not limited to the foregoing embodiments, and various variations/changes are possible within the spirit of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A server device for managing a map data, the server device comprising:

a storage unit configured to store map data of an area in which a mobile object for which a remote operation is able to be performed moves, wherein the mobile object is capable of moving autonomously based on the map data provided through communication via a network from the server device;

an acquisition unit configured to acquire, from the mobile object through communication via the network, an image obtained by imaging surroundings of the mobile object with an imaging unit provided in the mobile object;

a providing unit configured to provide, to a terminal device that performs the remote operation for the mobile object, through communication via the network, screen data of an operation screen configured for receiving a user operation to perform the remote operation for the mobile object and a user operation to process a map, the operation screen including the map which is displayed based on the map data stored in the storage unit, and the image acquired by the acquisition unit; and an update unit configured to acquire, from the terminal device through communication via the network, input data indicating an input through the operation screen displayed based on the screen data in the terminal device, and update the map data stored in the storage unit according to the input data acquired from the terminal device through communication via the network.

2. The server device according to claim 1, wherein the providing unit configures the operation screen such that a user operation for selecting a road or a region on the map included in the operation screen and adding information to the selected road or region is able to be received.

3. The server device according to claim 1, wherein the providing unit configures the operation screen such that a user operation for selecting a road or a region on the map included in the operation screen and adding information affecting passage of the mobile object in the selected road or region is able to be received.

4. The server device according to claim 3, wherein the information affecting the passage includes information indicating a restriction on the passage of the mobile object in the road or the region.

5. The server device according to claim 4, wherein the information affecting the passage further includes information indicating a scheduled release time of the restriction.

6. The server device according to claim 3, wherein the information affecting the passage includes whether or not the mobile object is able to enter the road or the region, or a condition that the mobile object is able to enter the road or the region.

7. The server device according to claim 1, wherein the providing unit displays the map on the operation screen such that whether or not each of roads or regions on the map has been processed is distinguishable.

8. The server device according to claim 1, wherein the map data indicates a map of a work area where a predetermined work is performed, and the providing unit displays the map on the operation screen such that whether or not the work is being performed for each of roads or regions on the map is distinguishable.

9. The server device according to claim 1, wherein the providing unit displays the map on the operation screen such that processing priorities set for respective roads or regions on the map are identifiable.

10. The server device according to claim 9, wherein the map data indicates a map of a work area where a predetermined work is performed, and includes information indicating a start time of the work in each of roads or regions on the map, and the providing unit sets a priority to be higher as a time until the start time becomes shorter for each of the roads or regions on the map.

11. The server device according to claim 9, wherein the map data indicates a map of a work area where a predetermined work is performed, and includes information indicating a start time and an end time of the work in each of roads or regions on the map, and the providing unit sets a priority to be higher for a road or a region where the work is not being performed than for a road or a region where the work is being performed on the map.

12. The server device according to claim 1, wherein the providing unit configures the operation screen to display an operation object for receiving a remote operation for the mobile object together with an operation object for receiving a user operation for adding information to a road or a region selected on the map.

13. The server device according to claim 1, wherein the providing unit configures the operation screen such that the map is displayed to be superimposed on a partial region of the image.

14. The server device according to claim 1, wherein the storage unit stores registration information of a user who operates the terminal device, and the server device further comprises an evaluation unit configured to evaluate, for each user included in the registration information, a skill level for processing work for the map using the terminal device based on a work history of the processing work, and store a result of the evaluation in association with the registration information.

15. The server device according to claim 1, wherein the mobile object is a carriage having a cargo bed for loading a material.

16. The server device according to claim 1, wherein the server device provides the map data to the mobile object through communication via the network, and the mobile object is capable of moving autonomously based on the map data provided through communication via the network from the server device.

17. A map creation system comprising: the server device according to claim 1; a mobile object for which a remote operation is able to be performed; and a terminal device that performs the remote operation for the mobile object, wherein the terminal device includes a remote operation unit configured to perform the remote operation for the mobile object via the server device, a display unit configured to display the operation screen based on the screen data provided from the server device through communication via a network, and a transmission unit configured to transmit, to the server device through communication via the network, the input data corresponding to a user operation received on the operation screen.

18. A map creation system comprising: a server device for managing a map data; a mobile object for which a remote operation is able to be performed; and a terminal device that performs the remote operation for the mobile object, wherein the server device includes a storage unit configured to store map data of an area in which the mobile object moves, wherein the mobile object is capable of moving autonomously based on the map data provided through communication via a network from the server device, a providing unit configured to provide, to the terminal device through communication via the network, screen data of an operation screen configured for receiving a user operation to perform the remote operation for the mobile object and a user operation to process a map, the operation screen including the map which is displayed based on the map data stored in the storage unit, and an update unit configured to update the map data stored in the storage unit in accordance with input data received from the terminal device through communication via the network and indicating an input through the operation screen, and the terminal device includes an acquisition unit configured to acquire, from the mobile object through communication via the network, an image obtained by imaging surroundings of the mobile object with an imaging unit provided in the mobile object, a display unit configured to display the operation screen based on the screen data provided from the server device through communication via the network, the display unit displaying the image acquired by the acquisition unit by including the image in the operation screen, and a transmission unit configured to transmit, to the server device through communication via the network, the input data corresponding to a user operation received on the operation screen.

19. A control method for a server device for managing a map data, the server device including a storage unit configured to storing map data of an area in which a mobile object for which a remote operation is able to be performed moves, the mobile object being capable of moving autonomously based on the map data provided through communication via a network from the server device, the control method comprising:

acquiring, from the mobile object through communication via the network, an image obtained by imaging surroundings of the mobile object with an imaging unit provided in the mobile object;

providing, to a terminal device that performs the remote operation for the mobile object, through communication via the network, screen data of an operation screen configured for receiving a user operation to perform the remote operation for the mobile object and a user operation to process a map, the operation screen including the map which is displayed based on the map data stored in the storage unit, and the acquired image; and acquiring, from the terminal device through communication via the network, input data indicating an input through the operation screen displayed based on the screen data in the terminal device, and updating the map data stored in the storage unit according to the input data acquired from the terminal device through communication via the network.

20. A non-transitory storage medium storing a program for causing a computer to execute the control method for the server apparatus according to claim 19.

\* \* \* \* \*